United States Patent

Huttunen et al.

[11] Patent Number: 5,903,850
[45] Date of Patent: May 11, 1999

[54] MOBILE PHONE AND INTERFACE CONFIGURATION IN A MOBILE PHONE

[75] Inventors: Timo Huttunen, Oulu; Pekka Lonka, Salo, both of Finland

[73] Assignee: Nokia Mobile Phones Ltd., Espoo, Finland

[21] Appl. No.: 08/849,085

[22] PCT Filed: Nov. 24, 1995

[86] PCT No.: PCT/FI95/00650

§ 371 Date: May 22, 1997

§ 102(e) Date: May 22, 1997

[87] PCT Pub. No.: WO96/17442

PCT Pub. Date: Jun. 6, 1996

[30] Foreign Application Priority Data

Nov. 25, 1994 [FI] Finland ................................... 945539

[51] Int. Cl.⁶ .................................................. H04B 1/38
[52] U.S. Cl. ...................... 455/557; 455/575; 455/345; 379/446; 379/449; 379/455
[58] Field of Search ..................... 455/550, 557, 455/566, 567, 568, 569, 571, 572, 575, 90, 95, 127, 128, 99, 344, 345, 346, 347, 349, 351; 379/455, 454, 449, 446, 431, 432, 428

[56] References Cited

U.S. PATENT DOCUMENTS

| | | |
|---|---|---|
| 4,792,986 | 12/1988 | Garner et al. ........................... 455/575 |
| 5,048,117 | 9/1991 | Aisaka et al. . |
| 5,054,115 | 10/1991 | Sawa et al. .............................. 455/90 |
| 5,206,954 | 4/1993 | Inoue et al. ............................. 455/282 |
| 5,239,586 | 8/1993 | Marui ....................................... 331/47 |
| 5,333,177 | 7/1994 | Braitberg et al. ....................... 455/559 |
| 5,649,311 | 7/1997 | Somei .................................... 455/131 |

FOREIGN PATENT DOCUMENTS

| | | |
|---|---|---|
| 0 468 790 | 1/1992 | European Pat. Off. . |
| 82573 | 11/1990 | Finland . |
| WO 94/24775 | 10/1994 | WIPO . |

Primary Examiner—Doris H. To
Attorney, Agent, or Firm—Perman & Green, LLP

[57] ABSTRACT

The invention relates to a mobile phone (1) and specifically to an interface for connecting external signals received from and transmitted to external devices to the mobile phone, and to an interface configuration for connecting the mobile phone to external signals. In the mobile phone of the invention, external digital signals are basically received and transmitted over a coaxial line (6) connected to an RF signal connector (3). In the interface configuration of the invention an interface unit (31) is provided at one end of the coaxial line (6), the interface unit controlling the transmission of external signals connected to connectors (35, 60, 61a, 61b, 61c) over the coaxial line (6) between the mobile phone (1) and the external devices. In one embodiment of the invention power supply to the mobile phone also takes place over the RF connector (3) and the coaxial line (6) connected to this.

13 Claims, 4 Drawing Sheets

MOBILE PHONE AND INTERFACE CONFIGURATION IN A MOBILE PHONE

FIELD OF THE INVENTION

The invention relates to a mobile phone, and specifically to an interface for connecting external signals, received from and transmitted to external devices, to the mobile phone, and to an interface arrangement for connecting the mobile phone to external signals. The mobile phone interface and interface configuration of the invention are practicable in any digitally operated mobile phones.

BACKGROUND OF THE INVENTION

As a rule, mobile phones comprise a plurality of interfaces including connectors for external signals and devices. The phone is usually provided with an interface for RF signals received and transmitted over an external aerial, and with a connector usually coaxial for this purpose, to which a coaxial line from an external aerial is connected. Control or data signals received or transmitted by the phone are transferred via a separate connector. Input and output audio signals frequently have a specific interface and connector. Charging current is supplied to the phone as D.C. supply over a specific connector. FIG. 1 is a schematic view of a typical, well-equipped hand-held mobile phone 1, which, besides its own aerial 1, comprises a coaxial RF connector 3 for input and output RF signals transmitted over an external aerial, a DC connector 4 for power supply and a 12-pin basic connector 5 for external audio, control and data signals.

The invention relates to a digitally operated mobile phone, comprising at least one interface including a connector for RF signals and requiring additional interfaces for at least some output and input digital signals, which may be audio signals, data signals or control signals. Besides these interfaces, a mobile phone requires an interface for supplying charging current. The mobile phone of the invention is particularly advantageous when installed in a car, the hand-held mobile phone being placed in a holder as an independently operating mobile phone, integrated in a versatile car equipment, including for instance a complete loudspeaker feature with an external loudspeaker and a microphone, an interface to an aerial outside the car, interfaces to external data and control signals, such as for instance a signal detecting the state of the ignition switch, an external alarm control, etc., and power supply from the car battery for instance.

Using several connectors in a single mobile phone naturally causes additional expenses, occasionally involving laborious connection of a number of lines. This conventional configuration has the additional drawback of strict protective steps imposed by EMC (Electromagnetic Compatibility ) requirements, both economically and technologically speaking. Electromagnetic protection of the mobile phone lines shall be provided by means of low-pass filters or band-pass filters at the interface of the phone connector. The great number of interfaces and connectors complicates the phone design considerably, calling for several filter components in the phone and entailing laborious and complicated manufacture. What is more, this kind of filter arrangement requires space in the phone set and will thus increase the weight and the size of the phone.

With some interfaces, for instance with a data interface, the transfer rate will not comply with EMC requirements. In that case it might be necessary to use an optical interface, which, again, requires large space and separate operating voltage.

OBJECT AND SUMMARY OF THE INVENTION

The object of the present invention is to provide a mobile phone interface and an interface arrangement that allow the drawbacks and problems described above to be eliminated. A mobile phone comprises an RF signal interface containing a connector over which input and output RF signals pass on a coaxial line connected to the connector. The mobile phone further comprises one or more interfaces for at least some of digital input and output signals, comprising audio signals, control signals and data signals, characterised in that the digital signal interfaces are connected to the RF signal interface such that the digital input and output signals are received and transmitted through the connector included in the RF signal interface on the coaxial line that is connected to the connector.

An interface configuration is disclosed for a mobile phone for connecting the mobile phone to external output and input signals that comprise external RF signals and external audio signals, control signals and data signals. The interface configuration is characterised in that an interface unit is connected to an end of a coaxial line opposite to the mobile phone, the interface unit comprising means for separating RF signals and digital signals received on the coaxial line, means for receiving and separating digital signals coming from the coaxial line and for transmitting digital signals to the coaxial line, a physical interface for RF signals, and physical interfaces for external input and output signals, comprising output and input audio signals, control signals and data signals corresponding to the digital signals. The interface configuration further comprises means for processing and controlling external input signals passing between the physical interfaces and the means for transmitting and receiving digital signals into corresponding digital input signals, and for processing digital output signals into corresponding external output signals.

BRIEF DESCRIPTION OF THE DRAWINGS

The invention will be described in further detail below with reference to the accompanying drawings, in which.

DETAILED DESCRIPTION OF THE INVENTION

Figure 2:
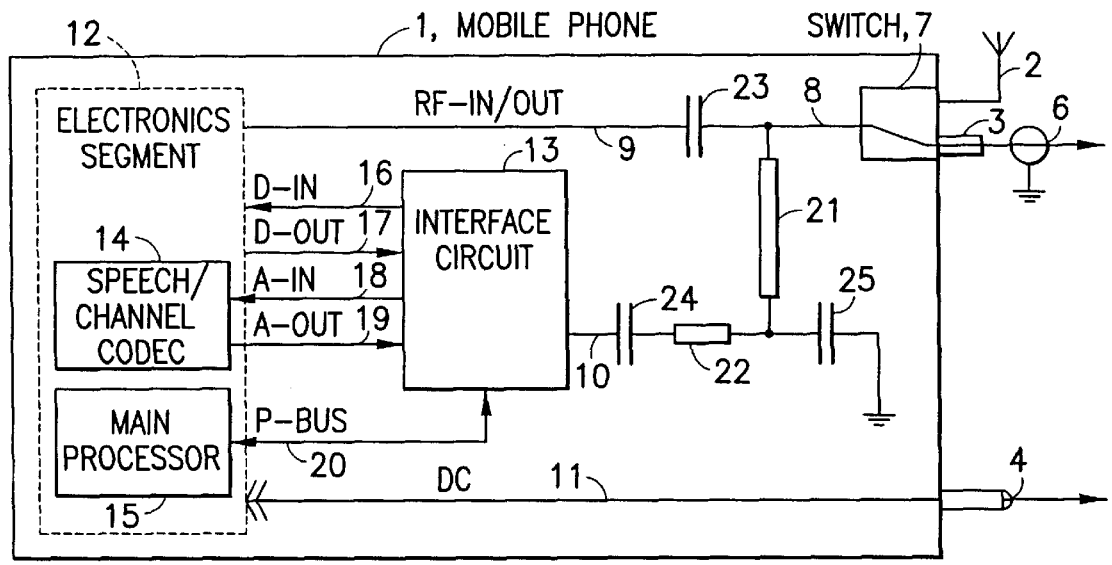
FIG. 2 is a schematic view of one embodiment of the mobile phone of the invention including its interface configuration.

FIG. 2 illustrates one embodiment of the mobile phone of the invention with its interface configuration. The mobile phone 1 has an aerial 2 and a connector 3 for input and output RF signals passing through the external aerial on a coaxial line 6 connected to the connector 3. A switch 7 is provided at the RF connector 3 and the aerial 2, the switch disconnecting an internal RF signal line 8, 9 in the phone from the aerial 2 and connecting it to the RF connector 3, when the coaxial line 6 is connected to the connector 3. The connector 3 is primarily a coaxial connector, but it is possible to use a different RF connector, which is say, symmetrical in some other respect than coaxially, without significantly affecting the characteristics of the interface in terms of EMC protection. The mobile phone electronics, comprising for instance RF signal transmission and reception circuits, including the entire signal processing associated with this, is generally illustrated by the electronics segment 12, the line 9 for RF-IN/OUT signals at a frequency of the order of 900 MHz being connected to this segment. FIG. 2 shows the speech/channel codec 14 and the main processor 15 as special segments in the electronics segment 2.

In the mobile phone of the invention, digital input and output signals, which may be audio signals, control signals and data signals, are received and transmitted over the connector 3 and the coaxial line 6. In the preferred embodiment of the invention, digital signals are transferred on the coaxial line when modulated to a relatively low-frequency carrier wave in the potential range of 1 to 5 MHz. In principle, a higher frequency is also usable as a carrier frequency, provided that it is clearly distinct from the radio frequencies being transmitted. The line connected to the connector 3 over the switch 6 branches into a RF signal line 9 and a line 10 for digital signals, and the mobile phone comprises means 21, 22, 23, 24 and 25 for separating RF signals and digital signals. In the embodiment of the invention shown in FIG. 2, these means include a capacitor 23 at the RF line 9 and a quarter-wave transfer line 21 and a capacitor 25 at the line 10 for digital signals, these means having been selected with values such that digital signals modulated for a carrier wave are conducted to line 10 and RF signals to line 9. The line 10 is additionally provided with a resistance 22 and a capacitor 24, which form a setting adapted to the carrier frequency concerned and filter off any direct current components. It is obvious to those skilled in the art that the embodiment described above is merely one of several possible embodiments, and that the means for separating RF signals and digital signals modulated to carrier frequency can be carried out in many optional ways.

The line 10 for a digital signal is connected to an interface circuit 13, which is devised to receive and separate digital signals received from the coaxial line 6 and accordingly, to transmit outgoing digital signals to the coaxial line. FIG. 2 is a schematic view of connections for various digital signals between the interface circuit 13 and the mobile phone electronic block 12 including the speech/channel codec 14 and the processor 15. These connections and signals may comprise input or output data or control signals, D-IN and D-OUT respectively, with corresponding lines 16 and 17 between the interface circuit and the electronics segment 12. In a car installment, these signals may consist for instance of a signal indicating the state of the ignition switch as an input signal, or a control signal from an external alarm as an output signal. Similarly, the lines 18 and 19 between the interface circuit 13 and the speech/channel codec 14 are intended for A-IN and A-OUT input and output audio signals. A typical A-IN audio signal is for instance a signal obtained from an external microphone, which is for the mobile hands-free function, and transformed into digital form, e.g. a bit flow sampled into 8-bit words at a 8 kHz frequency, coded by the speech/channel codec 14 for the traffic channel to be transmitted. Accordingly, the A-OUT output audio signal may be a similar bit flow to an external loudspeaker, which the speech/channel codec 14 has formed by decoding the line channel received. The digital signals transmitted on the coaxial line also contain P-BUS control or data signals between the mobile phone processor and external devices, which are received by the mobile phone main processor 15 or transmitted by this on the processor bus 20 between the interface circuit 13 and the processor 15. In the operation of the mobile phone of the invention, the necessary line between the main processor 15 and the interface circuit 13 also takes place over this bus 20. The parts and the operation of the interface circuit 13 and the digital signal transmission with the coaxial line 6 will be described in further detail below, in the explanation of FIG. 6.

Figure 3:
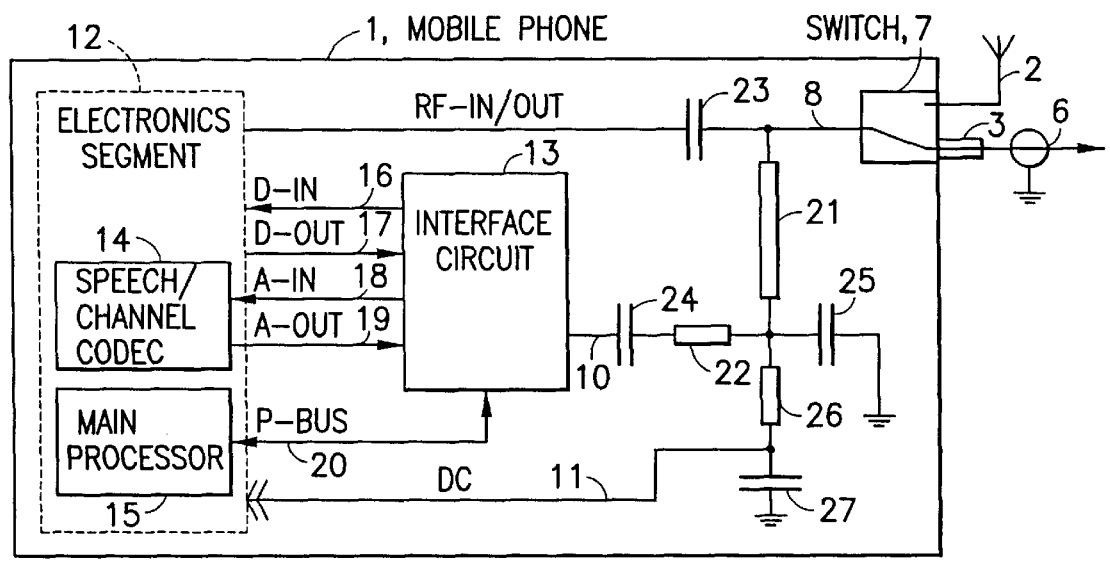
FIG. 3 is a schematic view of a second embodiment of the mobile phone of the invention including its interface configuration.

FIG. 3 illustrates another embodiment of the mobile phone of the invention and its interface configuration. This embodiment comprises a power supply, particularly charging current supply over a specific connector 4 in the embodiment of FIG. 2, over the coaxial line 6 and the connector 3. To this end, in addition to the means in the mobile phone 1 for separating RF signals from digital signals means for further separating supply current from digital signals to the supply current line 11 are provided. In the configuration shown in FIG. 3, the means of the arrangement in FIG. 2 have been supplemented with a choke coil 26, which prevents digital signals modulated to carrier frequency from reaching the current supply line 11, and a capacitor 27, which filters off any alternating current components having remained in the supply current. It is obvious to those skilled in the art that there are many other practical ways of separating direct current from RF signals and digital signals than the ones shown in FIG. 3. Apart from the current supply arrangement, the operation of the embodiment in FIG. 3 is identical to that of FIG. 2.

However, in most practical implementations, it is not useful to combine the current supply interface with the RF signal interface and the digital signal interface. In the configuration in FIG. 3, the choke coil 26 separating supply current from other signals will be of a cumbersome mechanical size, given that high inductance will be required, especially if the frequency of the other signals is low. High inductance alone is not enough, a sufficient wire thickness also being required for the supply current. Moreover, the ferrite core of the coil must not be saturated with supplied current, otherwise it might reduce inductance at the frequency of the other signals, which, in turn, would have a negative impact on filtering. The large-sized choke coil called for on the grounds set out above is not suitable for a hand-held mobile phone, which is the mobile phone version to which this invention is preferably applied.

Figure 4:
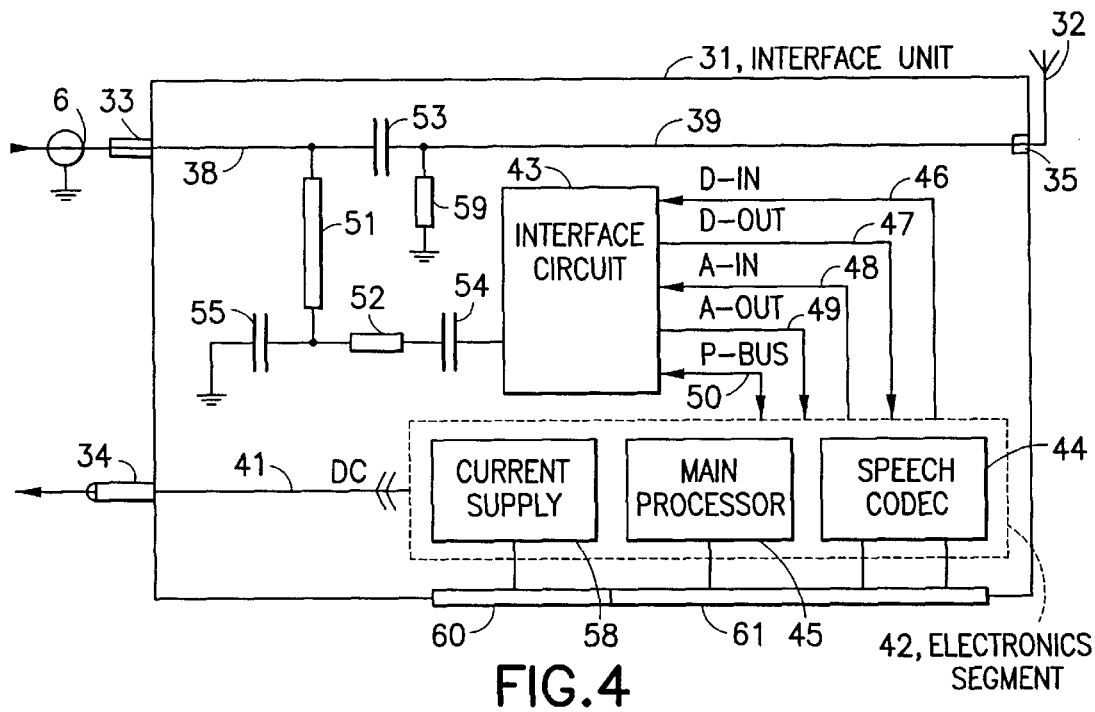
FIG. 4 is a schematic view of an interface unit in one version of the mobile phone interface configuration of the embodiment in FIG. 2.

For connection to external devices, the mobile phone of the invention requires an interface configuration, in which means are provided at the end of the coaxial line opposite to the mobile phone, which carry out the same functions as do the interface circuit 13 of the invention and the other connections of the embodiments in FIGS. 2 and 3 in a mobile phone. FIG. 4 illustrates one embodiment of an interface unit usable in the mobile phone interface configuration of the embodiment in FIG. 2. The interface unit 31 has a connector 33 for connecting the coaxial line 6, to which a signal line 38 is connected. The connector 33, as the connector 3, is principally coaxial, but may be some other type of RF connector. The means 51, 52, 53, 54 and 55, corresponding to the means 21, 22, 23, 24 and 25 of the mobile phone in FIG. 2, are separated by RF signals and digital signals. In addition, in interface unit 31, an inductance 59 has been connected to the RF line 39, the inductance forming together with the capacitor 53 a high-pass filter, which serves to prevent low-frequency signals from reaching the external aerial 32, for instance the external aerial of a car. The external aerial 32 may be connected to the interface unit 31 either directly or over the connector 35. The interface circuit 43 performs the same functions as the corresponding interface circuit 13 in the mobile phone, and is connected to lines 46 to 50, corresponding to lines 16 to 20, for the same D-IN, D-OUT, A-IN, A-OUT and P-BUS signals. These lines connect the interface circuit 43 with the electronics segment 44, which among other components comprises a speech/channel codec 42 and a main processor 45 corresponding to parts 14 and 15 of the mobile phone electronics segment 12. In this embodiment, the electronics segment further comprises a current supply segment 58, which has a separate current supply line over the line 41 and the connector 34 to the current supply connector 4 in the mobile phone. The interface unit is provided with a physical interface 60 for current supply, to which one can connect power supply from say, a car battery. The interface unit is also provided with physical interfaces 61 for external devices, for instance an external microphone and an external loudspeaker included in a loudspeaker feature, external data equipment or external control interfaces.

Figure 5:
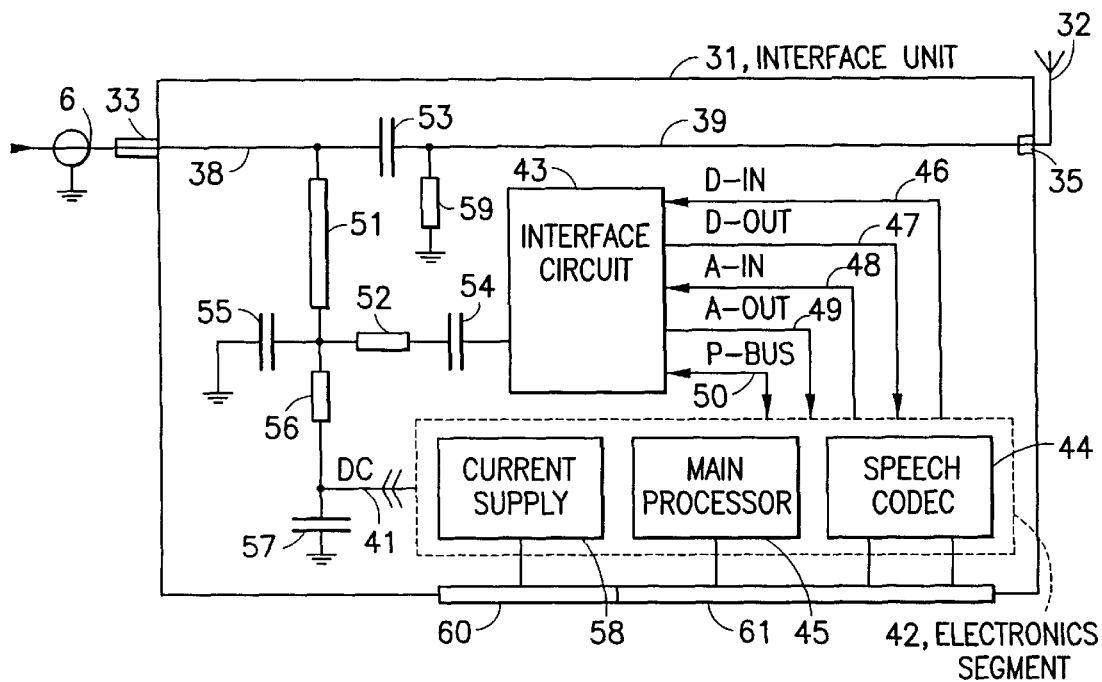
FIG. 5 is a schematic view of an interface unit in one version of the mobile phone interface configuration of the embodiment in FIG. 3.

FIG. 5 illustrates an interface unit, corresponding to the one in FIG. 4, which is usable in the interface configuration of the mobile phone of the embodiment in FIG. 3. The interface unit 31 in FIG. 5 differs from the one in FIG. 4 only in that it comprises a path formed by the choke coil 56 and the capacitor 57, which, alongside the components 51 to 55 for separating signals enables direct current to be fed from the line 41 to the coaxial line 6. The functions of the choke coil 56 and the capacitor 57 are equal to those of the corresponding choke coil 26 and capacitor 27 in the mobile phone pertaining to the interface configuration shown in FIG. 3.

Figure 6:
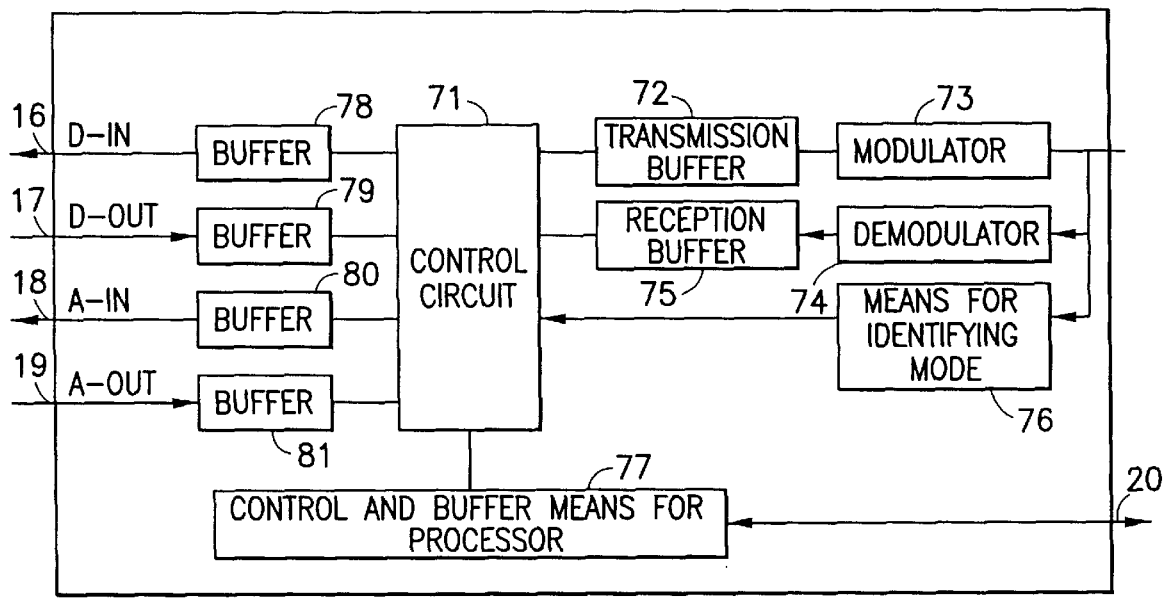

FIG. 6 is a schematic diagram of one embodiment of the interface circuit of the mobile phone of the invention and of its interface unit. As described above, the interface circuits 13 and 43, respectively, serve to receive and separate digital signals received from the coaxial line on the one hand, and to transmit digital signals to the coaxial line on the other hand. In the preferred embodiment of the invention, digital signals are bidirectionally transmitted on the coaxial line in a message form. Messages may be transmitted and received on the contention principle or the alternating principle. The interface circuit in FIG. 6 is an interface circuit 13 suitable for the embodiments of the mobile phone of the invention described above, and the figure indicates the lines to the interface circuit under the same references 8 and 16 to 20 as FIGS. 2 and 3. Line 8 is provided from the coaxial line to the interface circuit to which there are also lines 16 and 17 for received and transmitted D-IN and D-OUT data and control signals, lines 18 and 19 for received and transmitted A-IN and A-OUT digital audio signals, and a processor bus line 20 for P-BUS data and control signals of the processor. The control circuit 71 controls signal transmission and reception, and in doing this it communicates over line 20 with the main processor 15 (not shown in FIG. 6). For signal exchange with the processor, the interface circuit 13 is provided with control and buffer means 77 for the processor interface. Signals to be transmitted are recorded in the transmission buffer 72 and are transmitted from there over the modulator 73 to the line 8. Signals from the line 8 are demodulated in the demodulator 74 and are subsequently temporarily stored in the reception buffer 75. For the control of incoming and outgoing lines, the interface circuit 13 is provided with means 76 for identifying the mode of the coaxial line and a line from these means to the control circuit 71. The interface circuit 13 is also provided with buffers 78, 79, 80 and 81 and with lines 16, 17, 18 and 19 for D-IN, D-OUT, A-IN and A-OUT output and input digital signals. The interface circuits 43 in the interface units of the interface configuration embodiments illustrated in FIGS. 4 and 5 can be carried out with components and operations identical to the ones described above.

Figure 1:
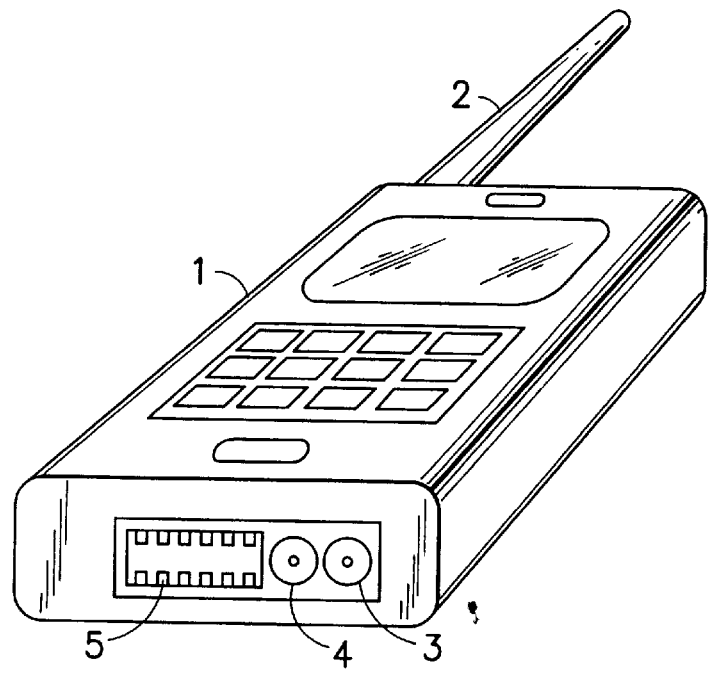
FIG. 1 is a perspective view of a conventional mobile phone with interface and connector arrangements for external signals and devices.
Figure 7:
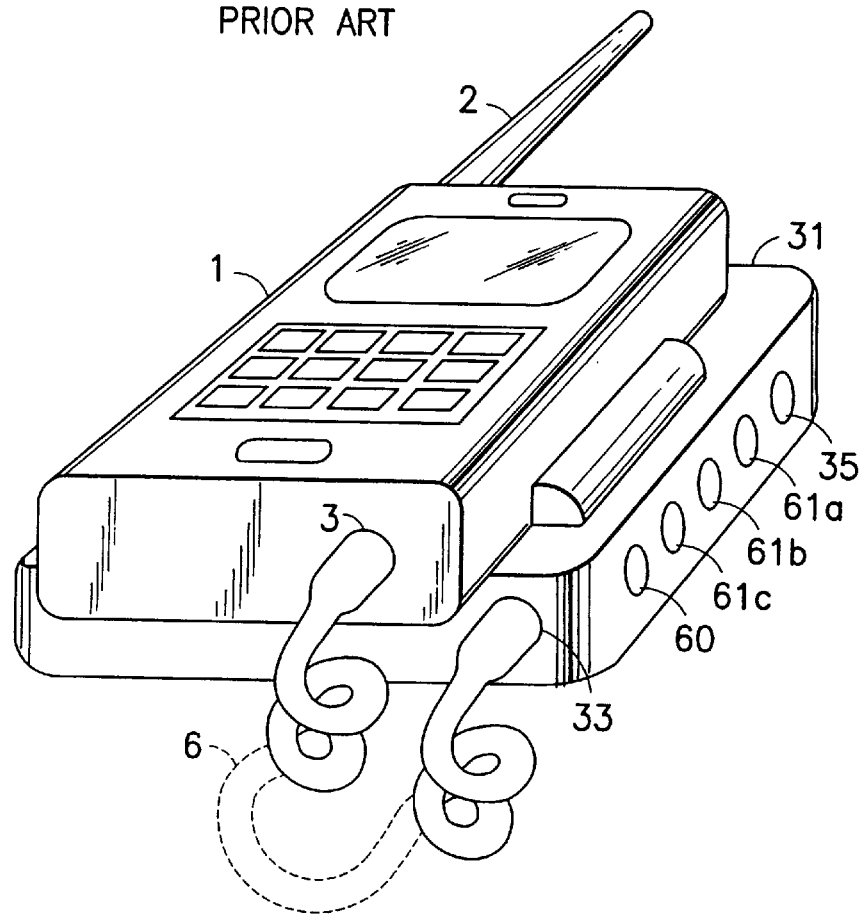
FIG. 6 is a block diagram of one embodiment of the interface circuit provided in the mobile phone of the invention and accordingly in the interface unit and FIG. 7 is a perspective view of the mobile phone of the invention installed in a car.

FIG. 7 illustrates the implementation of the mobile phone and the interface configuration of FIGS. 3 and 5 in a mobile phone installed in a car. For external connections, the mobile phone is only provided with a RF connector 3, connected to a coaxial line 6, for instance a coaxial spiral wire as shown in the figure. An interface unit 31 has been connected to the car installation holder, in which the coaxial line 6 is connected with the RF connector 33. As indicated in the figure, the holder may be provided with physical interfaces 35 in the interface unit 31 for an external aerial, 61a and 61b for an external loudspeaker and an external microphone included in a loudspeaker feature, 61c for data and control signals and 60 for power supply from the car battery for instance.

With the mobile phone and the interface configuration as illustrated in FIGS. 2 and 4, the phone and the car installation holder having separate connectors 3 and 34 for power supply, the connectors 3 and 4, or 33 and 34, may be located near each other, being set up such that the power supply line is connected to the coaxial line, and the connectors at either end of the line are combined into one single connector, connected with a single-step operation. This embodiment has not been illustrated in the drawings.

It is obvious to those skilled in the art that the basic inventive idea, i.e. receiving and transmitting various signals over a coaxial line connected to a mobile phone, can be carried out in various ways. A number of embodiments of the invention have been described in detail above, yet it is evident that the invention is not restricted to these embodiments, but may vary within the scope defined in the accompanying claims.

We claim:

1. A mobile phone comprising:

an RF signal interface containing a connector (3), over which input and output RF signals pass on a single coaxial conductor (6) connected to the connector (3), and one or more interfaces for at least some of digital input and output signals, comprising audio signals, control signals and data signals, characterised in that digital signal interfaces are connected to the RF signal interface such that the digital input and output signals are received and transmitted through the connector (3) also over said same coaxial conductor (6) over which said input and output RF signals pass, further characterised in that the digital input and output signals, when transferred on the coaxial conductor (6), are modulated onto a second carrier wave that is separate from first carrier waves that comprise said input and output RF signals.

2. A mobile phone as claimed in claim 1, characterised in that the frequency of the second carrier wave is within the range of 1 to 5 MHz.

3. A mobile phone as claimed in claim 1, characterised in that the digital input and output signals are transferred on the coaxial conductor (6) in a message form.

4. A mobile phone as claimed in claim 1, and further comprising:

means (21, 22, 23, 24, 25) for separating RF signals from digital signals passing to the connector (3) on the coaxial conductor and means (13) for receiving and separating digital signals and for transmitting digital signals.

5. A mobile phone as claimed in claim 4, characterised in that the means for separating RF signals from the digital signals comprise a quarter-wave transmission line (21) and a capacitor (25) to prevent RF signals from reaching the line (10) for digital signals.

6. A mobile phone as claimed in claim 4, characterised in that the means (13) for receiving and separating digital signals and for transmitting digital signals include:

control means (71) for controlling transmission and reception, modulating means (73) for modulating digital signals to be transmitted onto the second carrier wave, demodulating means (74) for demodulating received digital signals, buffer means (72, 75), respectively, for digital signals to be transmitted and for digital signals to be received, and means (76) for sensing the state of the interface for the purpose of controlling transmission and reception.

7. A mobile phone as claimed in claim 1, and further comprising a DC interface for providing a direct current supply to the mobile phone, characterised in that the DC interface is also connected to the RF signal interface such that direct current is supplied through the connector (3) included in the RF signal interface and the coaxial conductor (6) connected to the connector.

8. A mobile phone as claimed in claim 7, and further comprising means (26, 27) for separating supplied direct current from RF signals and digital signals.

9. An interface configuration for connecting a mobile phone to external output and input signals, comprising external RF signals and external audio signals, control signals and data signals, characterised in that an interface unit (31) is connected to an end of a single coaxial conductor (6) opposite to the mobile phone, the interface unit comprising:

means (51, 52, 53, 54, 55) for separating RF signals and digital signals both of which are received on the same coaxial conductor (6), means (43) for receiving and separating digital signals coming from the coaxial conductor (6) and for transmitting digital signals to the coaxial conductor, a physical interface (35) for RF signals, physical interfaces (61) for external input and output signals, comprising output and input audio signals, control signals and data signals corresponding to the digital signals, and means (42) for processing and controlling external input signals passing between the physical interfaces (61), and the means (43) for transmitting and receiving digital signals, into corresponding digital input signals, and for processing digital output signals into corresponding external output signals, wherein the digital input and output signals, when transferred on the coaxial conductor (6), are modulated onto a second carrier wave that is separate from first carrier waves that comprise said RF signals.

10. An interface configuration as claimed in claim 9, characterised in that the interface unit (31) further comprises:

a physical interface (60) for receiving supply current for current fed into the mobile phone, means (58, 41) for processing received supply current into direct current to be supplied to the mobile phone and means (56, 57) for filtering direct current supplied to the mobile phone and for also feeding the filtered direct current into the same coaxial conductor (6) that conveys the RF signals and the digital signals.

11. A mobile phone, comprising:

an external RF signal interface through which input and output RF signals pass over an external RF conductor, the RF signals having frequencies within a transmission and reception band of the mobile phone; and an external digital interface for inputting and outputting digital signals, said digital signals being input and output over said same external RF conductor as said RF signals, and being modulated onto a carrier having a frequency that differs from frequencies within said transmission and reception band, said digital signals being modulated onto said carrier for the purpose of transmission through said RF conductor.

12. A mobile phone as in claim 11, and further comprising a power interface for coupling DC operating power into said mobile phone, the DC operating power being input to said mobile phone over said same external RF conductor as said RF signals and said digital signals.

13. A mobile phone as in claim 11, wherein said external RF conductor is comprised of a coaxial cable.

* * * * *